United States Patent [19]

Kawai

[11] Patent Number: 4,785,780

[45] Date of Patent: Nov. 22, 1988

[54] CONTROL APPARATUS

[75] Inventor: Katsuhiko Kawai, Nagoya, Japan

[73] Assignee: Nippondenso Co., Ltd., Kariya, Japan

[21] Appl. No.: 69,514

[22] Filed: Jul. 2, 1987

[30] Foreign Application Priority Data

Jul. 8, 1986 [JP] Japan ............................... 61-159918
Dec. 4, 1986 [JP] Japan ............................... 61-289423
Feb. 26, 1987 [JP] Japan ............................... 62-43968

[51] Int. Cl.$^4$ ............................................. F02D 41/16
[52] U.S. Cl. ............................... 123/339; 364/431.07
[58] Field of Search ............... 123/339, 419, 436, 480;
364/431.04, 431.05, 431.07

[56] References Cited

U.S. PATENT DOCUMENTS

| 4,197,767 | 4/1980 | Leung . | |
|---|---|---|---|
| 4,492,195 | 1/1985 | Takahashi et al. . | |
| 4,638,778 | 1/1987 | Kamei ................................. | 123/339 |
| 4,653,449 | 3/1987 | Kamei et al. .................... | 123/339 X |
| 4,745,553 | 5/1988 | Raven et al. ..................... | 123/436 X |

FOREIGN PATENT DOCUMENTS 7752 1/1984 Japan .

Primary Examiner—Tony M. Argenbright
Attorney, Agent, or Firm—Cushman, Darby & Cushman

[57] ABSTRACT

A state value related to operating state of a controlled object is detected. An actuator serves to adjust the operating state of the controlled object. A target control quantity of the actuator is determined on the basis of the detected state value. The actuator is controlled in accordance with the determined target control quantity. The detected state value and the determined target control quantity are stored. A new target control quantity of the actuator is calculated on the basis of a vector of predetermined optimal feedback gain and a vector of state variables. The optimal feedback gain depends on model constants in a dynamic model which is an approximation to the operating state of the controlled object. The state variables are composed directly of the stored state value and the stored control quantity.

7 Claims, 7 Drawing Sheets

CONTROL APPARATUS

BACKGROUND OF THE INVENTION

1. Field of the invention

This invention generally relates to a control apparatus based on modern control theory. This invention specifically relates to an automotive control apparatus such as an automotive engine idle speed control apparatus.

2. Description of the Prior Art

Some known control apparatus and methods use modern control theory to improve response characteristics. For example, Japanese published unexamined patent application No. 59-7752 discloses a method of controlling idle speed of an internal combustion engine according to modern control theory. These known control apparatus and methods generally have problems as follows.

(1) In modern control theory, desired control quantity or quanties are calculated on the basis of state variables representing the internal state of a system controlling an controlled object. The state variables are estimated by constructing an observer. Generally, the state variables and the desired control quantity are periodically updated. Specifically, new state variables are estimated from currently detected values outputted by sensors, a preceding control quantity, and preceding state variables according to the observer. A new control quantity is determined on the basis of these new state variables. The object is controlled in accordance with the periodically updated control quantity. The accuracy of construction of an oberver greatly affects the accuracy of the control, so that an accurate observer is necessary for reliable control.

(2) An observer is generally designed through simulation requiring a long time and much labor.

(3) An observer is constructed in correspondence with a model, so that an accurate observer requires accurate modeling which causes a complicated model. The complicated model generally requires lengthy or difficult calculation during the control.

SUMMARY OF THE INVENTION

It is an object of this invention to provide a quickly responsive control apparatus dispensing with an observer.

In a control apparatus of this invention, state value related to operating state of a controlled object is detected. An actuator serves to adjust the operating state of the controlled object. A target control quantity of the actuator is determined on the basis of the detected state value. The actuator is controlled in accordance with the determined target control quantity. The detected state value and the determined target control quantity are stored. A new target control quantity of the actuator is calculated on the basis of a vector of predetermined optimal feedback gain and a vector of state variables. The optimal feedback gain depends on model constants in a dynamic model which is an approximation to the operating state of the controlled object. The state variables are composed directly of the stored state value and the stored control quantity.

In an engine idle speed control apparatus of this invention, speed of an engine is detected. An actuator serves to adjust the speed of the engine. A target control quantity of the actuator is calculated on the basis of the detected engine speed. The actuator is controlled in accordance with the determined target control quantity. The detected engine speed and the determined target control quantity are stored. A new target control quantity of the actuator is calculated on the basis of a vector of predetermined optimal feedback gain and a vector of state variables. The optimal feedback gain depends on model constants in a dynamic model which is an approximation to the operating state of the engine. The state variables are composed directly of the stored engine speed and the stored control quantity.

In another control apparatus of this invention, a value of a controlled parameter of a controlled object is periodically sampled. A difference between the sampled value of the controlled parameter and a target value of the controlled parameter is accumulated so that an accumulation value representing the accumulated difference is derived. The controlled parameter is adjusted in accordance with a variable control quantity. A value of the control quantity is periodically determined in synchronism with the sampling of the controlled parameter. The value of the control quantity equals a product of a preset optimal feedback gain vector and a state variable vector. The state variable vector is periodically determined in synchronism with the sampling of the controlled parameter. The state variable vector determined during a present period includes three components consisting of the accumulation value, the value of the controlled parameter sampled during the present period, and the value of the contol quantity determined during a period preceding the present period, respectively.

DESCRIPTION OF THE BASIC PREFERRED EMBODIMENT

A basic embodiment of this invention will be described with reference to FIG. 1. Although the basic embodiment of FIG. 1 is directed to an engine idle speed control apparatus, this invention can be applied to other control apparatus such as a feedback control apparatus for regulating the air-to-fuel ratio of an air-fuel mixture supplied to an engine.

Figure 1:
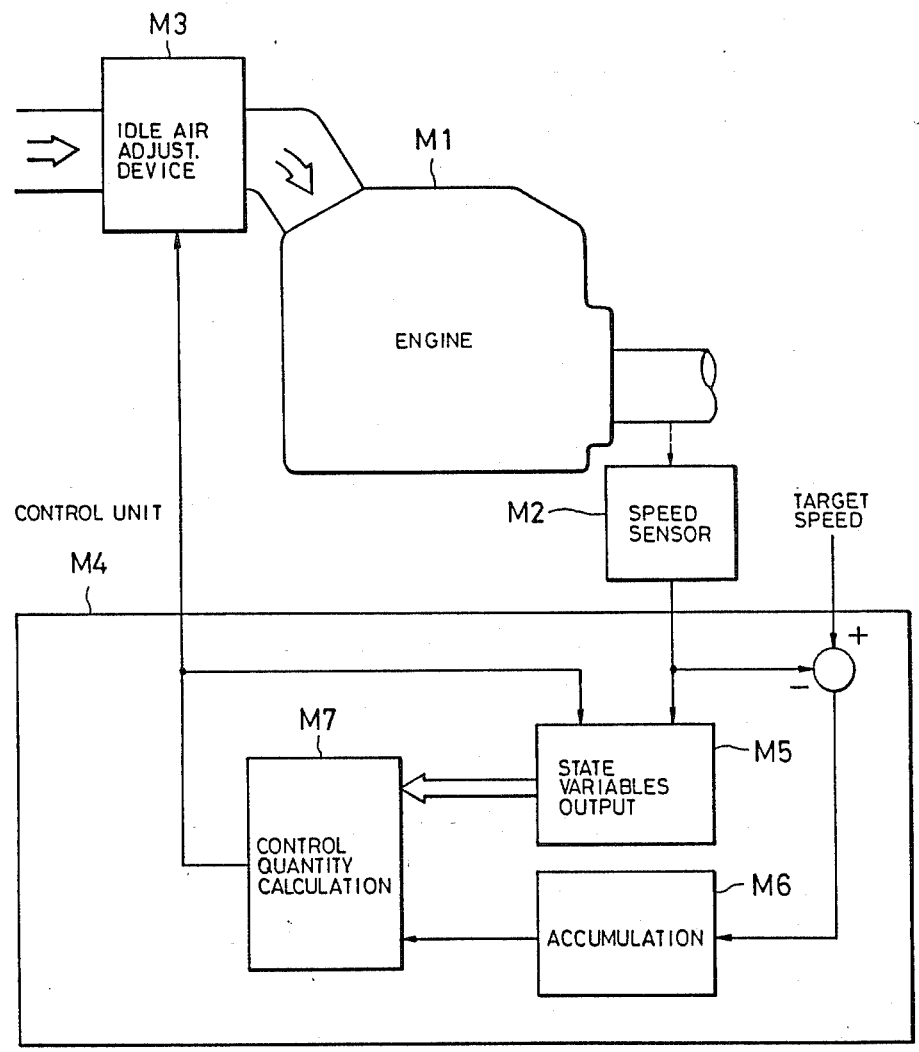
FIG. 1 is a diagram of a control apparatus according to a basic embodiment of this invention.

As shown in FIG. 1, a control apparatus for regulating the idle speed of an internal combustion engine M1 includes a sensor M2 associated with an output shaft of the engine M1 and generating a signal representative of the rotational speed Ne of the engine M1. The engine idle speed control apparatus also includes an engine speed adjustment device M3 and a main control unit M4 connected to the sensor M2 and the device M3.

The device M3 serves to adjust the rotational speed of the engine M1. The engine speed adjustment device M3 generally includes an arrangement for adjusting the rate of air-fuel mixture supply to the engine M1 or adjusting the rate of fuel supply to the engine M1. In cases where a fuel control system (not shown) adjusts the rate of fuel supply to the engine M1 with the rate of air supply to the engine M1 in order to regulate the air-to-fuel ratio of an air-fuel mixture supplied to the engine M1, the engine speed adjustment device M3 may include a device adjusting the rate of air flow into the engine M1 during engine idling operation. In cases where the engine M1 is of the diesel type, the engine speed adjustment device M3 can be composed of a device adjusting the rate of fuel supply to the engine M1. It should be noted that, in FIG. 1, the engine speed adjustment device M3 is shown as an idle air flow rate adjustment device disposed in an air intake passage leading to the engine M1.

During engine idling operation, the air adjustment device M3 controls the rate of air flow into the engine M1 in accordance with a signal outputted from the main control unit M4.

The main control unit M4 receives or internally generates a signal representing a target rotational idle speed Ne(*) of the engine M1. The main control unit M4 derives the actual engine speed Ne from the signal outputted by the sensor M2. In the main control unit M4, a target control quantity u of the air adjustment device M3 is determined in accordance with parameters including the actual engine speed Ne and the target engine speed Ne(*). The main control unit M4 supplies the air adjustment device M3 with a signal representing the target control quantity u. The device M3 adjusts the rate of air flow into the engine M1 by a value or degree corresponding to the target control quantity. The target control quantity is designed so that the actual engine speed can be regulated at the target idle engine speed.

The main control unit M4 includes a state variable output section M5, an accumulation section M6, and a control quantity calculation section M7.

The state variable output section M5 constructs a dynamic model of the engine M1. Specifically, the dynamic model is determined, through approximation, on the basis of an auto-regressive moving average model having a dead time p (p=0,1,2, . . . ) and an order [n,m](n=1,2,3, . . . , m=1,2,3, . . . ). Furthermore, disturbance is taken into consideration in determining the dynamic model. The state variable output section M5 receives the signal representing the actual engine speed Ne and also receives the signal representing the control quantity u of the air adjustment device M3. The state variable output section M5 generates a signal indicative of state variables X which represents the internal state of the dynamic model of the engine M1. The state variables X are generally composed of the actual engine speed Ne and the control quantity u of the air adjustment device M3.

A subtracting device within the main control unit M4 receives the signal representative of the actual engine speed Ne and the signal representative of the target idle engine speed Ne(*). The subtracting device generates a signal representing the difference value equal to the target engine speed Ne(*) minus the actual engine speed Ne, that is, equal to Ne(*)-Ne. The accumulation section M6 receives the difference signal. The section M6 accumulates the difference value Ne(*)-Ne and generates a signal representing the resulting accumulation value Z equal to Σ[Ne(*)-Ne].

The control quantity calculation section M7 receives the state variable signal and the accumulation signal. The section M7 calculates the target control quantity u of the air adjustment device M3 from an optimal feedback gain F, the state variables X, and the accumulation value Z. The optimal feedback gain F is predetermined in accordance with the previously-mentioned dynamic model. The section M7 generates the signal representing the target control quantity u of the air adjustment device M3.

The engine speed sensor M2 may be of the type generating a pulse signal having a frequency corresponding to the rotational speed of the engine output shaft. The engine speed sensor M2 may also be of the type generating a signal having a voltage depending on the rotational speed of the engine output shaft. In addition, the sensor M2 may be of the type generating a signal representing a variation in the rotational speed of the engine output shaft.

The idle air adjustment device M3 may be composed of a known arrangement operative to adjust an idle speed control valve disposed in a passage bypassing an engine throttle valve. The air adjustment device M3 may also be composed of other arrangements which can finely adjust the rate of air flow into the engine M1 during engine idling operation.

The main control unit M4 is designed in accordance with a dynamic model of a system controlling the idle speed of the engine M1. As described previously, the dynamic model is constructed, through approximation, on the basis of an auto-regressive moving average model having a dead time p (p=0,1,2,...) and an order [n,m](n=1,2,3,..., m=1,2,3,...). Furthermore, disturbance is taken into consideration in constructing the dynamic model. As described previously, the main control unit M4 includes the state variable output section M5, the accumulation section M6, and the control quantity calculation section M7.

The auto-regressive moving average model will be described in detail hereinafter. First, description will be made with respect to cases where a dead time p is equal to or greater than one or unity. The auto-regressive moving average model having a dead time p (p=1,2,...) and an order [n,m] takes the form expressed by the following equation.

$$Ne(k) = a_1 \cdot Ne(k-1) + a_2 \cdot Ne(k-2) + \ldots + \quad (1)$$
$$a_n \cdot Ne(k-n) + b_1 \cdot u(k-1-p) +$$
$$b_2 \cdot u(k-2-p) + \ldots + b_m \cdot u(k-m-p)$$

where the letter k represents the number of times of sampling. The auto-regressive moving average model is an approximation to the idle speed control system when the idle engine speed Ne is determined. In view of disturbance d, the equation (1) is modified as follows.

$$Ne(k) = a_1 \cdot Ne(k-1) + a_2 \cdot Ne(k-2) + \ldots + \quad (2)$$
$$a_n \cdot Ne(k-n) + b_1 \cdot u(k-1-p) +$$
$$b_2 \cdot u(k-2-p) + \ldots + b_m \cdot u(k-m-p) + d(k-1)$$

In this way, a dynamic model of the idle speed control system is constructed.

The dynamic model of the idle speed control system is also expressed by the following equation using state variables $X(k) = [X_1(k)\ X_2(k)\ \ldots\ X_{p+n+m-1}(k)]^T$.

model having an order $[m,n]$ is given by the following equation.

$$\begin{pmatrix} X_1(k+1) \\ X_2(k+3) \\ \vdots \\ X_{P+n+m-2}(k+1) \\ X_{P+n+m-2}(k+1) \end{pmatrix} = \begin{pmatrix} a_1\ a_2\ \cdots\ a_n & 0\cdots 0 & b_1\ b_2\ \cdots\ b_m \\ 1\ 0\ \cdots\ 0 & 0\cdots 0 & 0\cdots 0 \\ 0\ 1 & & \\ & \ddots & \\ 0\ \cdots\ 0\ 1\ 0 & 0\cdots 0 & 0\cdots 0 \\ \hline 0\ \cdots\ 0 & 0\cdots 0 & 0\cdots 0 \\ \hline 0\ \cdots\ 0 & 1\ 0\cdots 0 & 0\ 0 \\ & 0\ 1 & \\ & \ddots & \\ 0\ \cdots\ 0 & 0\cdots 0\ 1\ 0 & \end{pmatrix} \begin{pmatrix} X_1(k) \\ X_2(k) \\ \vdots \\ X_{P+n+m-2}(k) \\ X_{P+n+m-1}(k) \end{pmatrix} + \qquad (3)$$

$$\begin{pmatrix} 0 \\ \vdots \\ 0 \\ 1 \\ 0 \\ \vdots \\ 0 \end{pmatrix} u(k) + \begin{pmatrix} 1 \\ 0 \\ \vdots \\ 0 \\ 0 \\ \vdots \\ 0 \end{pmatrix} d(k)$$

It is understood from the equations (2) and (3) that the state variables $X(k)$ is expressed as follows.

$$X(k) = [Ne(k)\quad Ne(k-1)\ \ldots\ Ne(k-n+1) \qquad (4)$$
$$u(k-1)\ u(k-2)\ \ldots\ u(k-m-p+1)]^T$$

In cases where a dead time p equals 0 and disturbance d is considered, the auto-regressive moving average $$Ne(k) = a_1 \cdot Ne(k-1) + \ldots + a_n \cdot Ne(k-n+1) + \qquad (2')$$
$$b_1 \cdot u(k-1) + \ldots + b_m \cdot u(k-m+1) + d(k-1)$$

In this way, a dynamic model of the idle speed control system is constructed.

In the cases where the dead time p equals 0, the dynamic model of the idle speed control system is also expressed by the following equation using state variables $X(k) = [X_1(k)\ X_2(k)\ \ldots\ X_{n+m-1}(k)]^T$.

$$\begin{pmatrix} X_1(k+1) \\ X_2(k+3) \\ \vdots \\ X_{n+m-2}(k+1) \\ X_{n+m-2}(k+1) \end{pmatrix} = \begin{pmatrix} a_1\ a_2\ \cdots\ a_n & b_2\ b_3\ \cdots\ b_m \\ 1\ 0\ \cdots\ 0 & 0\ \cdots\ 0 \\ 0\ 1 & \\ & \ddots & \\ 0\ \cdots\ 0\ 1\ 0 & 0\ \cdots\ 0 \\ \hline 0\ \cdots\ 0 & 0\ \cdots\ 0 \\ \hline 0\ \cdots\ 0 & 1\ 0\ \cdots\ 0 \\ & 0\ 1 \\ & \ddots \\ 0\ \cdots\ 0 & 0\ \cdots\ 0\ 1\ 0 \end{pmatrix} \begin{pmatrix} X_1(k) \\ X_2(k) \\ \vdots \\ X_{n+m-2}(k) \\ X_{n+m-1}(k) \end{pmatrix} + \qquad (3')$$

$$\left\{ \begin{pmatrix} b_1 \\ 0 \\ \vdots \\ 0 \\ 1 \\ 0 \\ \vdots \\ 0 \end{pmatrix} \begin{matrix} \} n \\ \\ \} 1 \\ \\ \} m-2 \end{matrix} u(k) + \begin{pmatrix} 1 \\ 0 \\ \vdots \\ 0 \\ 0 \end{pmatrix} d(k) \right.$$

It is understood from the equations (2') and (3') that the state variables X (k) is expressed as follows.

$$X(k) = [Ne(k) \ldots Ne(k-n+1) \; u(k-1) \ldots u(k-m+1)]^T \quad (4')$$

The function of the state variable output section M5 depends on whether or not the dead time p equals 0. In cases where the dead time p is equal to or greater than 1, the state variable output section M5 holds the values $Ne(k), Ne(k-1), \ldots, Ne(k-n+1), u(k-1), u(k-2), \ldots, u(k-m-p+1)$ used in the control during a period until the present moment and outputs these values as state variables. In cases where the dead time p equals 0, the state variable output section M5 holds the values $Ne(k), Ne(k-1), \ldots, Ne(k-n+1), u(k-1), u(k-2), \ldots, u(k-m+1)$ used in the control during a period until the present moment and outputs these values as state variables.

During engine idling operation, the accumulation section M6 sums up or integrates the difference value equal to the target idle engine speed Ne(*) minus the actual engine speed Ne, that is, equal to Ne(*)-Ne. The accumulation section M6 outputs the resulting accumulation value $Z = \Sigma[Ne(*) - Ne(k)]$.

The incorporation of the accumulation value Z into the idle speed control compensates errors (roughness in approximation) produced in modeling, disturbances such as variations in the load on the engine M1, variations in the model of the control system due to ageing of the engine M1 or the idle speed control valve, and other adverse factors. Furthermore, the incorporation of the accumulation value Z into the idle speed control compensates errors inevitably produced during calculations in a digital control system, for example, quantization errors.

The control quantity calculation section M7 determines a target control quantity u of the air adjustment device M3 in accordance with the optimal feedback gain F, the state variables X fed from the state variable output section M5, and the accumulation value Z fed from the accumulation section M6. The optimal feedback gain F is predetermined on the basis of a dynamic model of the idle speed control system. Specifically, the optimal feedback gain F can be predetermined by simulation using performance index or function.

The previous description was made on the premise that the idle speed control system is linear. In cases where the idle speed control system is nonlinear, the total range of the condition or state of the system is divided into portions around respective steady points where the system can be approximately handled as linear with respect to the steady points, and models are constructed for the respective divided ranges.

The construction of a dynamic model, and specifically the determination of the coefficients or values $a_1, a_2, \ldots, b_1, b_2, \ldots$ in the equations (1), (2), and (2'), can be performed by system identification, and for example, experimentally performed by a step response method.

The apparatus of FIG. 1 operates as follows. The sensor M2 supplies the state variable output section M5 with the signal representing the actual engine speed Ne. The state variable output section M5 also receives the signal representing the control quantity u of the air adjustment device M3. The section M5 outputs the actual engine speed Ne and the control quantity u, which occurred during a period until the present moment, as state variables X representing the internal state of a system controlling the idle speed of the engine M1. The control quantity calucation section M7 is informed of the state variables X. The accumulation section M6 supplies the control quantity calculation section M7 with the signal representing the accumulation value Z of the difference between the target idle engine speed Ne(*) and the actual engine speed Ne. The section M7 calculates a target control quantity u of the air adjustment device M3 from the state variables X, the accumulation value Z, and the optimal feedback gain F. During engine idling operation, the main control unit M4 controls the air adjustment device M3 in accordance with the calculated target control quantity u so that the actual engine speed Ne can be regulated at the target idle engine speed Ne(*).

DESCRIPTION OF THE SPECIFIC PREFERRED EMBODIMENT

A specific embodiment of this invention will be described with reference to FIGS. 2-7. Although the specific embodiment of FIGS. 2-7 is basically directed to an engine idle speed control apparatus, this invention can be applied to other control apparatus such as a feedback control apparatus for regulating the air-to-fuel ratio of an air-fuel mixture supplied to an engine.

Figure 2:
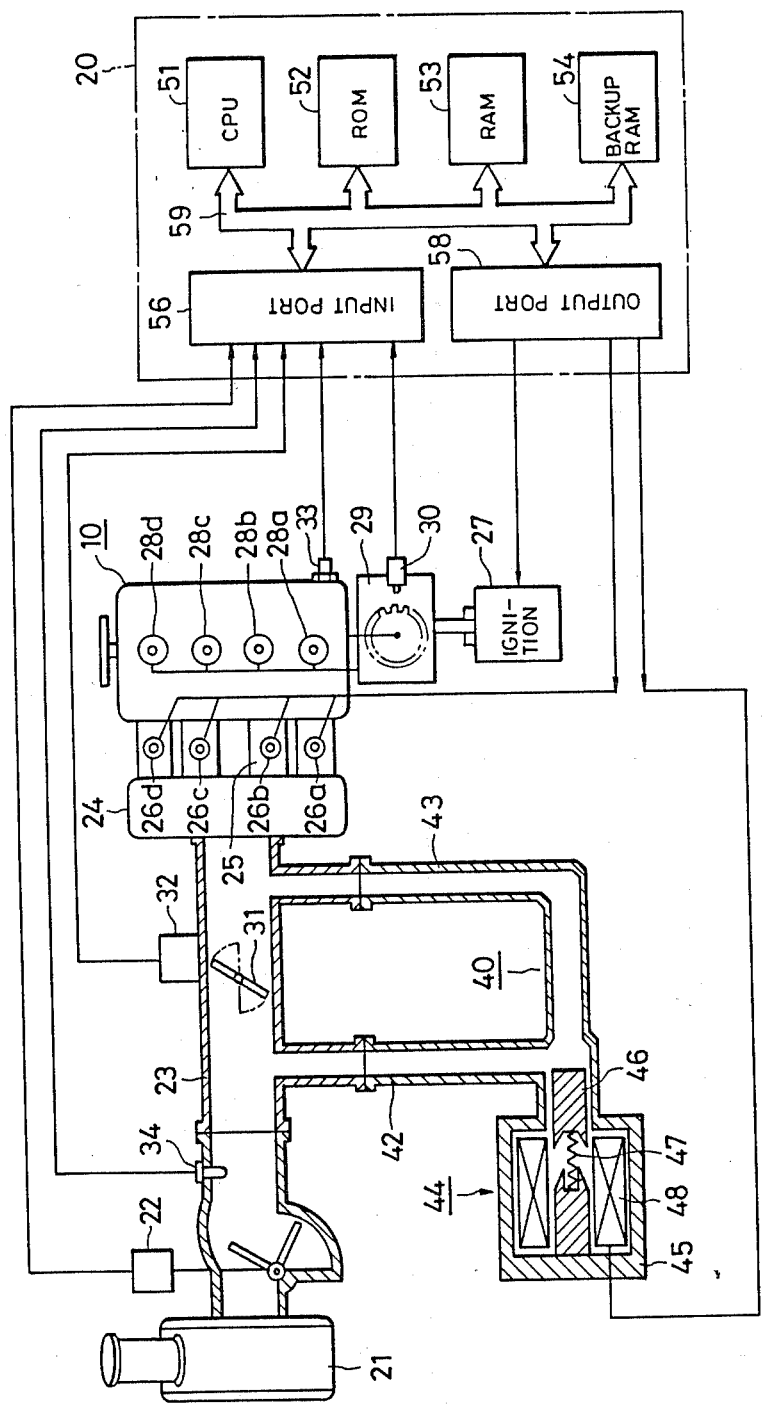
FIG. 2 is a diagram of a control apparatus according to a specific embodiment of this invention.

With reference to FIG. 2, an automotive spark-ignition internal-combustion engine 10 is of the 4-cylinder 4-cycle type. The spark timing of the engine 10, the rate of fuel injection into the engine 10, and the idle speed of the engine 10 are controlled via an electronic control unit 20. The engine idle speed control will be mainly described hereinafter.

As shown in FIG. 2, an air intake duct 23 extends between an air cleaner 21 and a surge tank 24. The surge tank 24 communicates with cylinders of the engine 10 via respective air intake branch tubes 25 defined by an intake manifold. Air is drawn into the engine cylinders via the air cleaner 21, the air intake duct 23, the surge tank 24, and the air intake branch tubes 25. An air flow meter 22 has a sensing element disposed in the air intake duct 23. The air flow meter 22 detects the rate of air flow into the engine 10 and generates a signal indicative thereof. The air flow rate signal is applied to the electronic control unit 20.

Fuel is pumped from a fuel tank (not shown) to electrically-driven fuel injection valves 26a, 26b, 26c, and 26d attached to the respective air intake branch tubes 25. The devices 26a–26d serve to inject fuel into the branch tubes 25 at an adjustable rate. The rate of fuel injection is adjusted via signals outputted from the electronic control unit 20 to the fuel injection valves 26a–26d.

An ignition circuit 27 generates high tension pulses which are sequentially applied to spark plugs 28a, 28b, 28c, and 28d via a distributor 29. The spark plugs 28a–28d are mounted on the engine 10. Working portions of the spark plugs 28a–28d are disposed in the engine cylinders respectively. When the spark plugs 28a–28d are subjected to high tension pulses, they produce sparks in the associated engine cylinders. The timing of the occurrence of a spark is controlled via a signal outputted from the electronic control unit 20 to the ignition circuit 27.

A rotational engine speed sensor 30 disposed in the distributor 29 detects the rotational speed Ne of the engine 10 and generates a signal indicative thereof. The engine speed signal is applied to the electronic control unit 20. The engine speed sensor 30 opposes a ring gear rotating in synchronism with rotation of the crankshaft of the engine 10. The engine speed sensor 30 generates pulses at a frequency proportional to the engine rotational speed. For example, the engine speed sensor 30 generates 24 pulses while the engine crankshaft rotates through 720°.

A throttle valve 31 is movably disposed in a portion of the air intake duct 32 downstream of the air flow meter 22. The throttle valve 31 adjustably determines the rate of air flow into the engine 10. Specifically, the rate of air flow into the engine 10 depends on the position of the throttle valve 31 or on the degree of opening of the throttle valve 31. A position sensor 32 connected to the throttle valve 31 detects the opening degree TH of the throttle valve 31 and generates an analog signal indicative thereof. The throttle opening degree signal is applied to the electronic control unit 20. The throttle sensor 32 includes an idle switch which generates an on-off or binary signal representing whether or not the throttle valve 31 is essentially fully closed. The throttle fully closed signal is applied to the electronic control unit 20. Since the throttle valve 31 is essentially fully closed when the engine 10 is idling, the electronic control unit 20 uses the throttle fully closed signal in determining whether or not the engine 10 is idling.

A temperature sensor 33 attached to the engine 10 detects the temperature Thw of engine coolant and generates a signal indicative thereof. The coolant temperature signal is applied to the electronic control unit 20. Another temperature sensor 34 attached to a portion of the air intake duct 23 between the air flow meter 22 and the throttle valve 31 detects the temperature Tam of air drawn into the engine and generates a signal indicative thereof. The air temperature signal is applied to the electronic control unit 20.

An end of a bypass passage 40 is connected to a point of interior of the air intake duct 23 upstream of the throttle valve 31 but downstream of the air flow meter 22. The other end of the bypass passage 40 is connected to a point of interior of the air intake duct 23 downstream of the throttle valve 31. In this way, the passage 40 bypasses the throttle valve 31. When the throttle valve 31 is essentially closed so that the engine 10 idles, air is drawn into the engine 10 via the bypass passage 40.

The bypass passage 40 is defined by an upstream tube 42, a downstream tube 43, and an air adjustment or idle speed control valve 44. The idle speed control valve 44 will be referred to as the ISC valve 44 hereinafter. The upstream tube 42 extends between the ISC valve 44 and the portion of the air intake duct 23 upstream of the throttle valve 31. The downstream tube 43 extends between the ISC valve 44 and the portion of the air intake duct 23 downstream of the throttle valve 31. The ISC valve 44 variably determines the effective cross-sectional area of the bypass passage 40. Since the rate of air flow through the bypass passage 40 depends on the effective cross-sectional area of the bypass passage 40, the rate of air flow through the bypass passage 40 is adjusted via the ISC valve 44.

The ISC valve 44 is basically composed of a linear solenoid valve including a housing 45 and a movable valve member 46 disposed within the housing 45. The degree of opening through the ISC valve 44 depends on the position of the valve member 46. Since the degree of opening through the ISC valve 44 determines the effective cross-sectional area of the bypass passage 40, the rate of air flow through the bypass passage 40 depends on the position of the valve member 46. The position of the valve member 46 is adjustably determined in accordance with the force of a compression helical spring 47 and the electromagnetic force created by an electric current flowing through a winding 48 disposed within the housing 45. The spring 47 normally holds the valve member 46 in a fully closed position where the bypass passage 40 is fully blocked. As an electric current passing through the winding 48 increases, the valve member 46 is moved from its fully closed position toward a fully open position against the force of the spring 47. Accordingly, the rate of air flow through the bypass passage 40 can be adjusted in accordance with the electric current passing through the winding 48. The ISC valve 44 is controlled via a signal outputted from the electronic control unit 20 to the winding 48. The signal applied to the winding 48 preferably includes a pulse signal having a variable duty cycle. The effective position of the valve member 46 and the rate of air flow through the bypass passage 40 depend on the duty cycle of the pulse signal applied to the winding 48. The pulse signal applied to the winding 48 preferably has a fixed frequency and a variable pulse width. Pulse-width modulation allows variations in the duty cycle of the pulse signal applied to the winding 48.

It should be noted that the ISC valve 44 may be of the pressure-responsive type or the diaphragm type. The ISC valve 44 may also be of the type including a stepping motor driving a valve member.

The electronic control unit 20 includes a microcomputer having a central processing unit (CPU) 51, a read-only memory (ROM) 52, a random-access memory (RAM) 53, a backup RAM 54, an input port 56, and an output port 58. The devices 51–54, 56, and 58 are connected via a bus 59. The input port 56 receives the signals from the air flow meter 22, the throttle sensor 32, the coolant temperature sensor 33, the air temperature sensor 34, and the engine speed sensor 30. The output port 58 supplies the control signals to the fuel injection valves 26a-26d, the ignition circuit 27, and the ISC valve 44.

The electronic control unit 20 derives engine operating conditions, such as the air flow rate AR, the air temperature Tam, the throttle opening degree TH, the coolant temperature Thw, and the engine speed Ne, from the input signals outputted by the sensors. The electronic control unit 20 calculates or determines a target fuel injection rate, a target spark timing, and a target opening degree or target control quantity of the ISC valve 44 in accordance with the engine operating conditions. The control signal applied to the fuel injection valves 26a-26d is adjusted in accordance with the target fuel injection rate so that the actual fuel injection rate can be equal to the target fuel injection rate. The target fuel injection rate is determined in accordance with the air flow rate in a known way so that the target fuel injection rate is basically proportional to the air flow rate. This relationship between the target fuel injection rate and the air flow rate allows the air-to-fuel ratio of an air-fuel mixture to be maintained essentially at a desired value. The control signal applied to the ignition circuit 27 is adjusted in accordance with the target spark timing so that sparks can occur within the engine cylinders at a timing corresponding to the target spark timing. The control signal applied to the ISC valve 44 is adjusted in accordance with the target opening degree of the ISC valve 44 so that the actual opening degree of the ISC valve 44 can be equal to the target opening degree.

During engine idling operation, the opening degree of the ISC valve 44 determines the rate of air flow into the engine 10. Since the rate of fuel injection into the engine is made basically proportional to the air flow rate by the fuel injection rate control, adjustment of the air flow rate automatically causes a variation in the rate of air-fuel mixture supply to the engine 10. The rate of air-fuel mixture supply to the engine 10 determines the power output of the engine 10. The engine speed depends on the engine power output. Accordingly, during engine idling operation, the engine speed is controlled via the ISC valve 44.

The engine idle speed control will be described in more detail hereinafter. In order to perform idle speed control, the electronic control unit 20 is designed as follows.

(1) Modeling of Controlled Object

In cases where a system controlling idle engine speed is approximated by an auto-regressive moving average model having an order [n,m] (n=m=2) and a dead time p (p=1) corresponding to a delay due to a sampling time, the previously-mentioned equation (1) results in the following equation.

$$Ne(k) = a_1 \cdot Ne(k-1) + a_2 \cdot Ne(k-2) + \quad (5)$$
$$b_1 \cdot u(k-2) + b_2 \cdot u(k-3)$$

In view of disturbance d, the equation (5) corresponding to the model of the idle speed control system is modified as follows.

$$Ne(k) = a_1 \cdot Ne(k-1) + a_2 \cdot Ne(k-2) + \quad (6)$$
$$b_1 \cdot u(k-2) + b_2 \cdot u(k-3) + d(k-1)$$

where the variables u represent control quantities of the ISC valve 44 which correspond to duty cycles of the pulse signal applied to the winding 48 of the ISC valve 44. In addition, the variable k represents the number of times of execution of control from the moment of the start of first sampling.

The transfer function G of the idle speed control system is determined in a step response method. The coefficients or constants $a_1$, $a_2$, $b_1$, and $b_2$ in the equation (6) are experimentally determined by referring to the transfer function G. In this way, the model of the idle speed control system represented by the equation (6) is determined.

(2) Method of Representing State Variables X

When state variables $X(k) = [X_1(k)\ X_2(k)\ X_3(k)\ X_4(k)]^T$ are used and the equation (3) is referred to, the equation (6) is rewritten as follows.

$$\begin{pmatrix} X_1(k+1) \\ X_2(k+1) \\ X_3(k+1) \\ X_4(k+1) \end{pmatrix} = \begin{pmatrix} a_1 & a_2 & b_1 & b_2 \\ 1 & 0 & 0 & 0 \\ 0 & 0 & 0 & 0 \\ 0 & 0 & 1 & 0 \end{pmatrix} \begin{pmatrix} X_1(k) \\ X_2(k) \\ X_3(k) \\ X_4(k) \end{pmatrix} + \quad (7)$$

$$\begin{pmatrix} 0 \\ 0 \\ 1 \\ 0 \end{pmatrix} u(k) + \begin{pmatrix} 1 \\ 0 \\ 0 \\ 0 \end{pmatrix} d(k)$$

Accordingly, the state variables X are given by the following equations.

$$\left. \begin{array}{l} X_1(k) = Ne(k) \\ X_2(k) = Ne(k-1) \\ X_3(k) = u(k-1) \\ X_4(k) = u(k-2) \end{array} \right\} \quad (8)$$

(3) Designing of Integral-added Regulator

Figure 3:
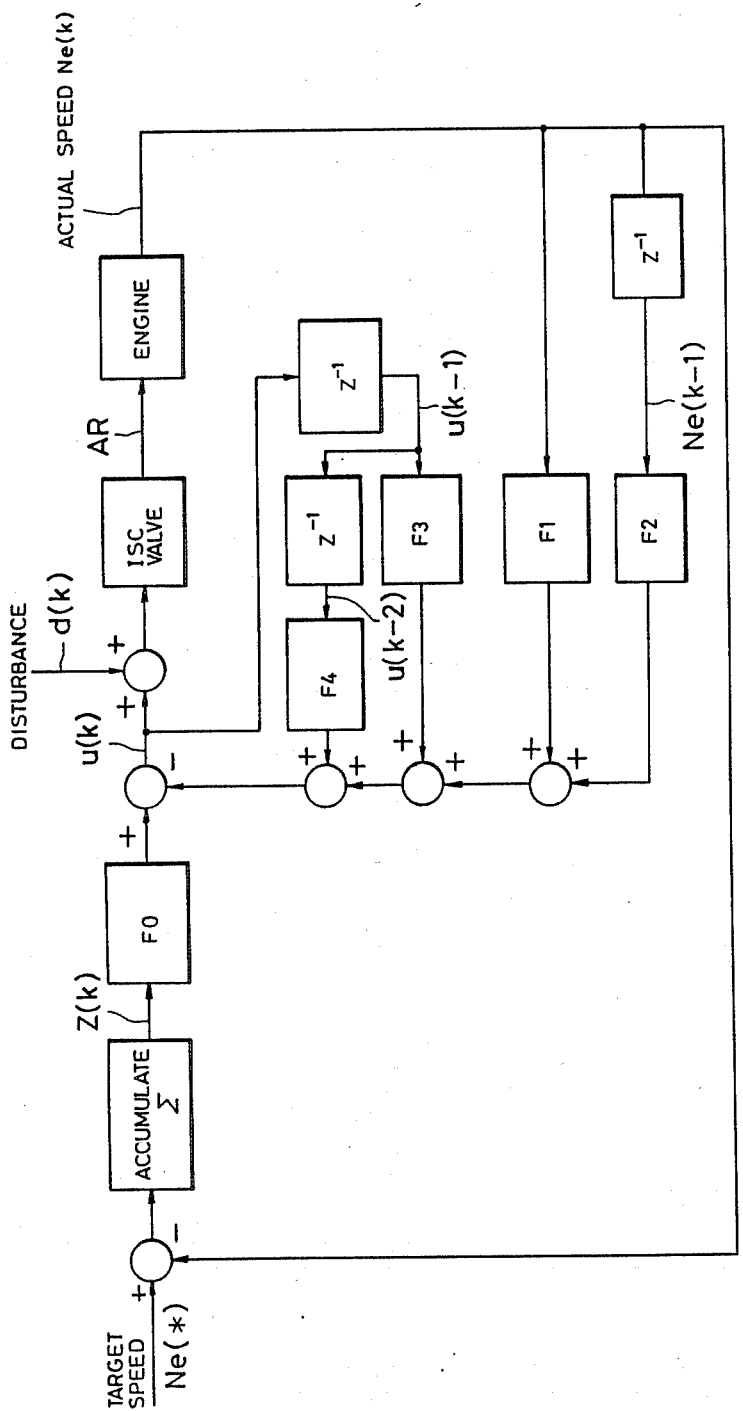
FIG. 3 is a block diagram of a system controlling idle speed in the control apparatus of FIG. 2.

When an integral term or component for compensating control errors is added and an integral-added regulator is designed in connection with the equations (7) and (8), a target control quantity u of the ISC valve 44 is determined as follows. With reference to FIG. 3, when an optimal feedback gain $F = [F0\ -F1\ -F2\ -F3\ -F4]$ and expanded state variables $[Z(k)\ X_1(k)\ X_2(k)\ X_3(k)\ X_4(k)]^T = ]Z(k)\ Ne(k)\ Ne(k-1)\ u(k-1)\ u(k-2)]^T$ are used, a target control quantity u(k) is given by the following equation.

$$\begin{aligned} u(k) &= F \cdot X(k) \\ &= F0 \cdot Z(k) - F1 \cdot Ne(k) - F2 \cdot Ne(k-1) - \\ &\quad F3 \cdot u(k-1) - F4 \cdot u(k-2) \end{aligned} \quad (9)$$

where the variable Z(k) represents an accumulation value of the difference $\Delta Z(k)$ between the target idle engine speed Ne(*) and the actual engine speed Ne. The difference $\Delta Z(k)$ equals the target idle engine speed Ne(*) minus the actual engine speed Ne, that is, $\Delta Z(k)=Ne(*)-Ne$. The accumulation value Z(k) is given by the following equation.

$$Z(k+1)=Z(k)+\Delta Z(k) \tag{10}$$

Figure 4:
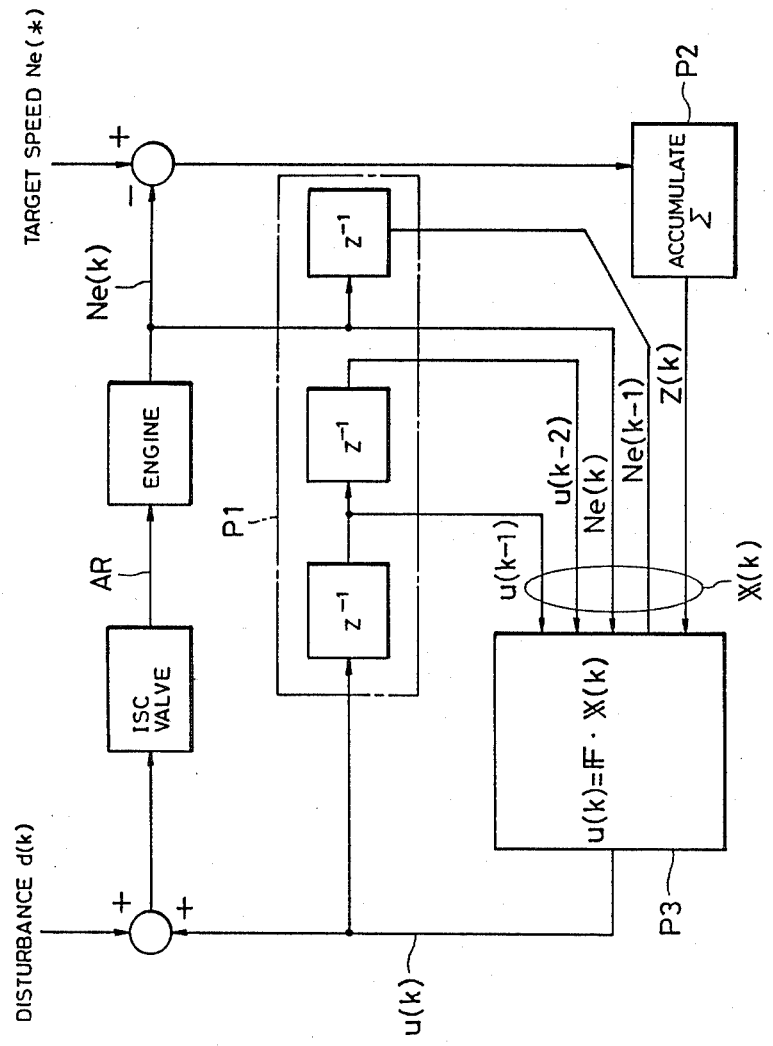
FIG. 4 is another block diagram of the system controlling idle speed in the control apparatus of FIG. 2.

In FIG. 3, blocks of $Z^{-1}$ transform represent functions or devices deriving values u(k−1), u(k−2), and Ne(k−1) from values u(k), u(k−1), and Ne(k) respectively. For example, the $Z^{-1}$ transform block deriving the control quantity u(k−1) from the control quantity u(k) corresponds to the fact that the control quantity u(k−1) used in a certain execution cycle of the control has been stored in the RAM 53 and the stored control quantity u(k−1) is read out and used in the next execution cycle of the control. The other $Z^{-1}$ transform blocks correspond to similar facts. FIG. 4 is a block diagram of the idle speed control system which is obtained by rewriting the block diagram of FIG. 3 with reference to the equations (9) and (10). In FIG. 4, blocks P1, P2, and P3 correspond to the state variable output section, the accumulation section, and the control quantity calculation section respectively.

(4) Determination of Optimal Feedback Gain F

An optimal feedback gain F is determined in a way as follows.

(Optimal Servo System)

The optimal feedback gain F is determined so that the following performance index or function can be minimized.

$$\Delta J = \sum_{k=0}^{\infty} [Q(Ne(k) - Ne(*))^2 + R(u(k) - u(k-1))^2] \tag{11}$$

where the letters Q and R represent weight parameters. The performance index J is intended to minimize the deviation of the actual engine speed Ne(k) from the target idle engine speed Ne(*) while restricting the control quantity u(k) of the ISC valve 44. The weight to the restriction on the control quantity u(k) can be varied in accordance with the weight parameters Q and R. In general, the optimal feedback gain F=[F0−F1−F2−F3−F4] is determined by changing the weight parameters Q and R and repeating simulation until optimal control characteristics are obtained.

The optimal feedback gain F=[F0−F1−F2−F3−F4] depends on the model constants $a_1$, $a_2b_1$, and $b_2$. Accordingly, to ensure the system stability (robustness) against variations (parameter variations) in the system controlling the actual idle engine speed, it is necessary to consider variations of the model constants $a_1$, $a_2b_1$, and b in determining the optimal feedback gain F. Thus, the simulation is performed while variations of the model constants $a_1$, $a_2b_1$, and $b_2$ which can actually occur are considered, so that the optimal feedback gain F able to satisfy the stability is obtained. Such variations can result from various causes, such as ageing of the ISC valve 44, clogging of the bypass passage 40, and changes of the engine load.

The previously-mentioned modeling of the controlled object, method of representing the state variables, designing of the integral-added regulator, and determination of the optimal feedback gain are performed beforehand. The electronic control unit 20 merely uses their results, that is, the equations (9) and (10), in actual idle speed control.

Figure 5:
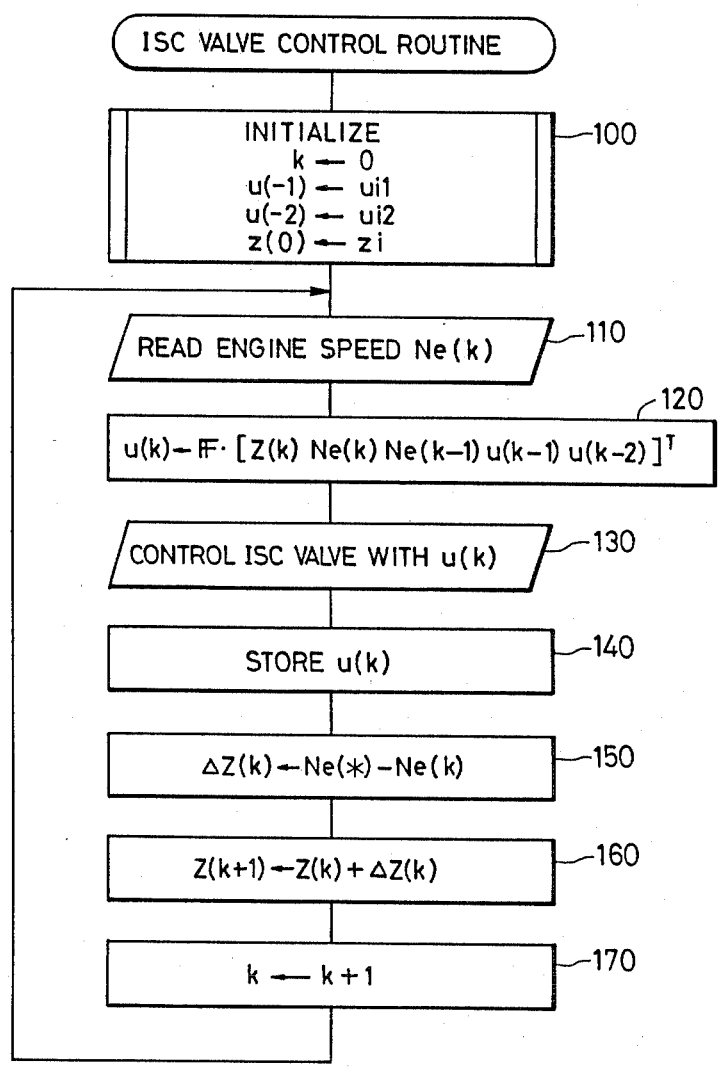
FIG. 5 is a flowchart of a program operating the electronic t of FIG. 2.

The electronic control unit 20 operates in accordance with a program stored in the ROM 52. When the electronic control unit 20 is powered, the unit 20 starts to execute the program. The program includes various control routines, such as fuel injection rate control routine and ISC valve control routine. Preferably, the electronic control unit 20 determines or detects whether or not the engine 10 is idling in accordance with engine operating conditions such as the position of the throttle valve 31 and the engine speed in a known way. When engine idling operation is detected, the electronic control unit 20 preferably starts to execute the ISC valve control routine. When engine idling operation ends, the electronic control unit 20 preferably suspends the execution of the ISC valve control routine. FIG. 5 is a flowchart of the ISC valve control program.

As shown in FIG. 5, a first step 100 of the ISC valve control program performs initialization. Specifically, the variable k representing the number of times of sampling is set equal to 0. The initial values u(−1) and u(−2) of the control quantity of the ISC valve 44 are set equal to predetermined constants ui1 and ui2 respectively. The initial value Z(0) of the accumulation value of the difference between the target idle engine speed Ne(*) and the actual engine speed Ne is set equal to a predetermined constant Zi. After the step 100, the program advances to a step 110.

The step 110 derives the current engine speed Ne(k) from the signal outputted by the engine speed sensor 30.

A step 120 subsequent to the step 110 determines a target control quantity u(k) of the ISC valve 44 in accordance with the optimal feedback gain F and the state variables X by referring to the following equation or statement.

$$u(k)=F\cdot[Z(k)\ Ne(k)Ne(k-1)\ u(k-1)\ u(k-2)]^T$$

In the first execution of the step 120 after the execution of the initialization step 100, the value Ne(k−1) is regarded as equal to the value Ne(k), that is, the relationship Ne(k)=Ne(k−1) is assumed.

A step 130 following the step 120 contols the ISC valve 44 in accordance with the control quantity u(k) determined by the preceding step 120. Specifically, the duty cycle of the control pulse signal outputted from the electronic control unit 20 to the winding 48 of the ISC valve 44 is set to a value corresponding to the control quantity u(k). Accordingly, the opening degree of the ISC valve 44 and thus the rate of air-fuel mixture supply to the engine 10 are controlled in accordance with the control quantity u(k).

A step 140 following the step 130 stores the conrol quantity u(k) in the RAM 53. The stored control quantity will be used as a preceding control quantity u(k−1) in the next execution cycle of the program.

A step 150 subsequent to the step 140 calculates the difference value $\Delta Z(k)$ which equals the target idle engine speed Ne(*) minus the actual engine speed Ne.

A step 160 subsequent to the step 150 accumulates the difference value and thereby determines the accumulation value Z(k+1) by referring to the following equation or statement.

$$Z(k+1)=Z(k)+\Delta Z(k)$$

After the step 160, the program advances to a step 170.

The step 170 increments the value k by one or unity with reference to the following equation or statement.

$$k=k+1$$

After the step 170, the program returns to the step 110. Accordingly, the steps 110-170 are reiterated. Preferably, the reiteration of the steps 110-170 continues until the engine idling operation ends.

As described previously, the state variables X representing the internal state of the engine idle speed control system are composed of the inputs Ne(k) and Ne(k−1) to the system, the outputs u(k−1) and u(k−2) from the system, and the accumulation value Z(k) of the difference between the actual engine speed and the target idle engine speed. The control quantity u(k) of the ISC valve 44 is determined by the vector product of the state variables X and the preset optimal feedback gain F. In this way, the control quantity of the ISC valve 44 is determined without using an observer.

Figure 6:
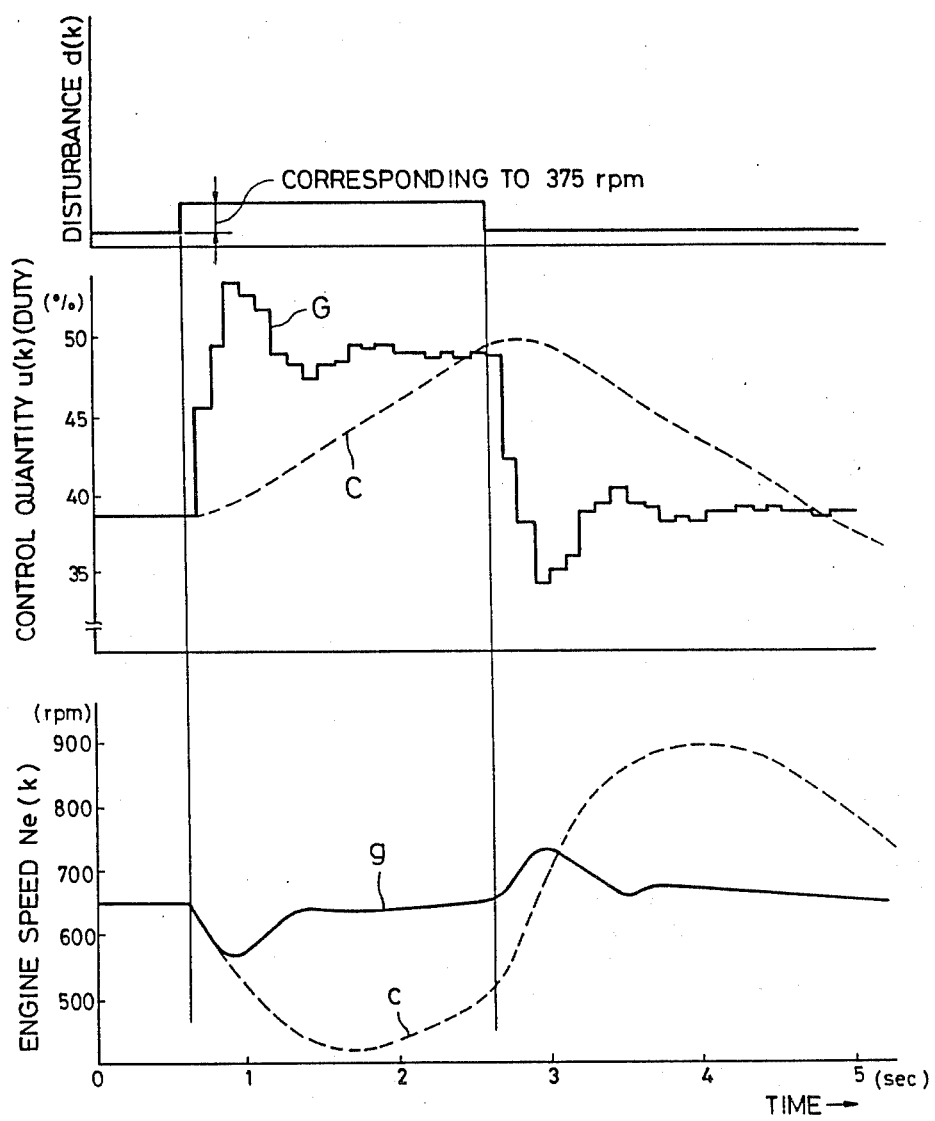
FIGS. 6 and 7 are diagrams showing time dependent variations in the disturbances, the control quantities, and the engine speeds in the engine idle speed control apparatus of this invention and a conventional engine idle speed control apparatus.
Figure 7:
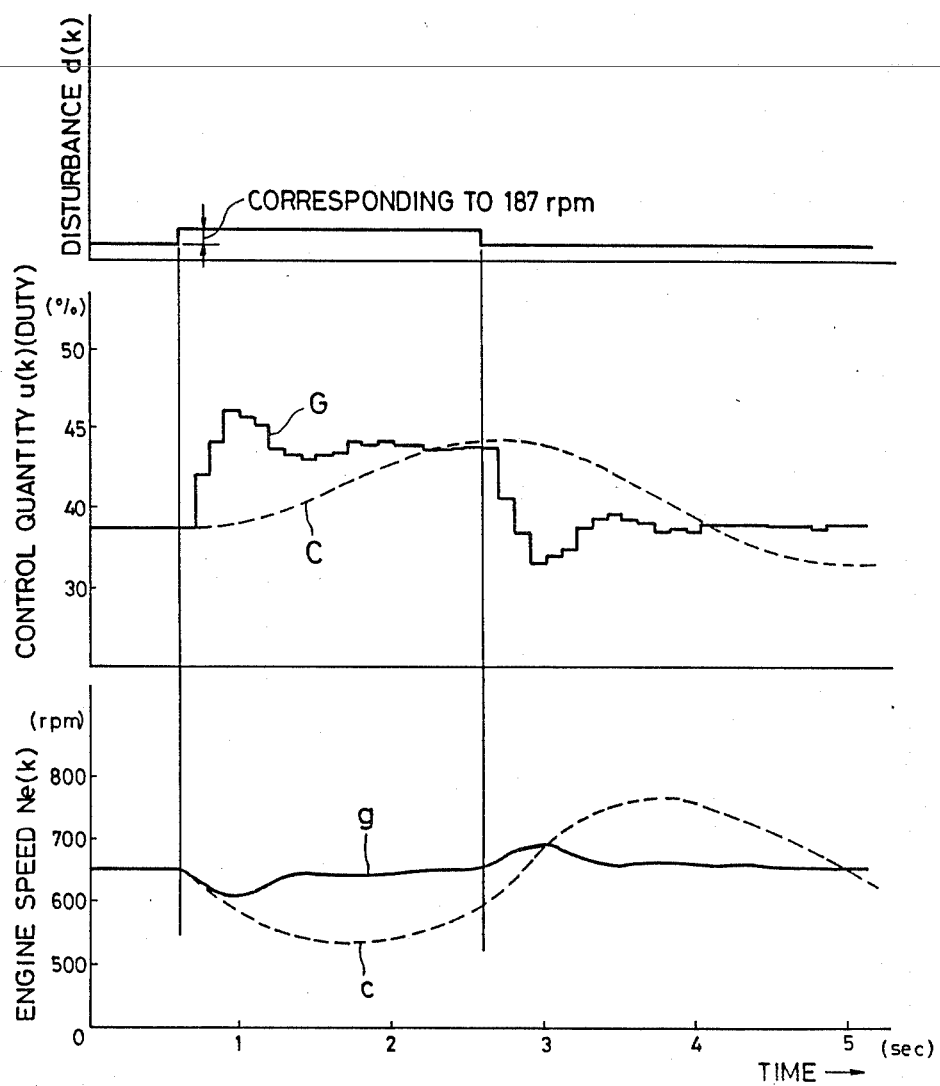

FIG. 6 shows characteristics of the engine idle speed control apparatus according to the embodiment of this invention and also characteristics of a conventional PI-type (proportional plus integral type) engine idle speed control apparatus under conditions where there are disturbances d(k) which can vary the engine speed Ne by a value equal to 375 rpm. FIG. 7 shows characteristics of the engine idle speed control apparatus according to the embodiment of this invention and also characteristics of the conventional PI-type engine idle speed control apparatus under conditions where there are disturbances d(k) which can vary the engine speed Ne by a value equal to 187 rpm. For example, the disturbances of FIGS. 6 and 7 can result from engine load variations caused by activation and deactivation of an air conditioner. In FIGS. 6 and 7, the broken lines C represent control quantities u(k) of the ISC valve 44 and the broken lines c represent engine speeds Ne in the conventional control apparatus. Furthermore, the solid lines G represent control quantities u(k) of the ISC valve 44 and the solid lines g represent engine speeds Ne in the control apparatus of this invention. As understood from FIGS. 6 and 7, the engine idle speed control apparatus of this invention has quicker response characteristics than the response characteristics of the conventional engine idle speed control apparatus. In addition, the engine idle speed control apparatus of this invention more effectively limits variations in the engine speed than the conventional engine idle speed control apparatus.

As described previously, the engine idle speed control apparatus according to the embodiment of this invention dispenses with an observer. Accordingly, a model of the system controlling the engine idle speed can be easily constructed, and a time necessary for designing can be shortened. In addition, the engine idle speed control apparatus according to the embodiment of this invention can be easily accommodated to design changes.

The optimal feedback gain F may also be determined in other ways. One of the other ways of determining the optimal feedback gain F will be desribed in the following. When the system controlling engine idle speed is represented by an auto-regressive moving average model having an order [1,1] and a dead time p equal to unity or one, the following equation is given.

$$Ne(k) = a \cdot Ne(k-1) + b \cdot u(k-2) + d(k-1) \tag{6'}$$

where the letters a and b denote model coefficients or constants. The state variables X (k) is expressed by the following equation.

$$X(k) = [Ne(k) u(k-1)]^T \tag{8'}$$

Accordingly, an expanded state variables X (k) is given by the following equation.

$$X(k) = [Z(k) Ne(k) u(k-1)]^T$$

The optimal feedback gain F equal to [F0−F1−F2] is determined in accordance with the previously-mentioned optimal servo system. Specifically, the components of the optimal feedback gain F are determined in terms of the model constants as follows.

$$\left. \begin{array}{l} F0 = t - a/b + 1/b \\ F1 = (a + 1)t + 1/b \\ F2 = bt + 1 \end{array} \right\} \tag{12}$$

where the character t denotes a positive solution of the following equation.

$$a \cdot b \cdot R \cdot t^2 + (R - a^2 \cdot R + b^2 \cdot Q) \cdot t - a \cdot b \cdot Q = 0$$

The second of the other ways of determining the optimal feedback gain F will be described in the following. The second other way uses a finite time settling servo system. In correspondence with the equation (9), the following equation is derived.

$$\begin{aligned} u(k) &= F \cdot X(k) \\ &= F0 \cdot Z(k) - F1 \cdot Ne(k) - F2 \cdot u(k-1) \end{aligned} \tag{9'}$$

In view of the equations (3), (8'), (9'), and (10), the state equation of the whole control system related to the ISC valve 44 is expressed as follows.

$$\left. \begin{array}{l} \begin{pmatrix} Z(k+1) \\ X_1(k+1) \\ X_2(k+1) \end{pmatrix} = \\ \begin{pmatrix} 1 & -1 & 0 \\ 0 & a & b \\ F0 & -F1 & -F2 \end{pmatrix} \begin{pmatrix} Z(k) \\ X_1(k) \\ X_2(k) \end{pmatrix} + \begin{pmatrix} Ne(*) \\ d \\ 0 \end{pmatrix} \\ [Z(k) \ X_1(k) \ X_2(k)]^T = \\ [Z(k) \ Ne(k) \ u(k-1)]^T \end{array} \right\} \tag{13}$$

The characteristic polynomial is calculated as follows.

$$\det \begin{pmatrix} Z-1 & 1 & 0 \\ 0 & Z-a & -b \\ -F0 & F0 & Z+F1 \end{pmatrix} = \tag{14}$$

$$Z^3 + (F2 - a - 1)Z^2 + [bF1 - (a+1)F2 + a]Z + bF0 - bF1 + aF2$$

When the coefficients are determined so that the equation (14) can be equal to $Z^3$, a finite time settling servo system is constructed. The components of the determined optimal feedback gain F are given as follows.

$$\left.\begin{array}{l} F2 = a + 1 \\ F1 = (a^2 + a + 1)/b \\ F0 = 1/b \end{array}\right\} \quad (12')$$

The third of the other ways of determining the optimal feedback gain F will be described in the following. The third other way uses the designation of eigenvalues. A target characteristic polynomial is assumed as follows.

$$Z^{p+2} + a_{p+1}Z^{p+1} + a_p Z^p + \ldots + a_1 Z + a_0$$

The optimal feedback gain F is determined by comparing the target characteristic polynomial and the equation corresponding to the equation (14). Specifically, a target characteristic polynomial is assumed as follows.

$$Z + \alpha_2 Z^2 + \alpha_1 Z + \alpha_0 \quad (15)$$

When the equation (15) is compared with the equation (14), the components of the optimal feedback gain F are determined as follows.

$$\left.\begin{array}{l} F2 = \alpha_2 + a + 1 \\ F1 = [\alpha_1 + \alpha_2(a + 1) + a^2 + a + 1]/b \\ F0 = (\alpha_0 + \alpha_1 + \alpha_2 + 1)/b \end{array}\right\} \quad (12'')$$

It should be understood that this invention is not limited to the previously-mentioned embodiments and various modifications may be made in the embodiments within the scope of this invention. For example, in modeling of the system, the dead time or delay p may differ from one or unity.

What is claimed is:

1. A control apparatus comprising:
  (a) means for detecting a state value related to operating state of a controlled object;
  (b) an actuator adjusting the operating state of the controlled object; and
  (c) means for determining a target control quantity of the actuator on the basis of the detected state value and controlling the actuator in accordance with the determined target control quantity;
  wherein the determining/controlling means comprises:
    means for storing the detected state value and the determined target control quantity; and
    means for calculating a new target control quantity of the actuator on the basis of a vector of predetermined optimal feedback gain and a vector of state variables, wherein the optimal feedback gain depends on model constants in a dynamic model which is an approximation to the operating state of the controlled object, and wherein the state variables are composed directly of the state value stored in the storing means and the control quantity stored in the storing means.

2. The control apparatus of claim 1 wherein the determining/controlling means further comprises means for accumulating a difference between a predetermined target state value and the detected state value and thereby calculating an accumulation value representing the accumulated difference, and wherein the state variables are composed directly of the state value stored in the storing means, the control quantity stored in the storing means, and the accumulation value.

3. An idle speed control apparatus for an engine comprising:
  (a) means for detecting a speed of the engine;
  (b) an actuator adjusting the speed of the engine; and
  (c) means for determining a target control quantity of the actuator on the basis of the detected engine speed and controlling the actuator in accordance with the determined target control quantity;
  wherein the determining/controlling means comprises:
    means for storing the detected engine speed and the determined target control quantity; and
    means for calculating a new target control quantity of the actuator on the basis of a vector of predetermined optimal feedback gain and a vector of state variables, wherein the optimal feedback gain depends on model constants in a dynamic model which is an approximation to the operating state o the engine, and wherein the state variables are composed directly of the engine speed stored in the storing means and the control quantity stored in the storing means.

4. The control apparatus of claim 3 wherein the determining/controlling means further comprises means for accumulating a difference between a predetermined target idle engine speed and the detected engine speed and thereby calculating an accumulation value representing the accumulated difference, and wherein the state variables are composed directly of the state value stored in the storing means, the control quantity stored in the storing means, and the accumulation value.

5. A control apparatus comprising:
  (a) means for periodically sampling a value of a controlled parameter;
  (b) means for accumulating a difference between the sampled value of the controlled parameter and a target value of the controlled parameter and thereby deriving an accumulation value representing the accumulated difference;
  (c) means for adjusting the controlled parameter in accordance with a variable control quantity;
  (d) means for periodically determining a value of the control quantity in synchronism with the sampling of the controlled parameter, wherein the value of the control quantity equals a product of a preset optimal feedback gain vector and a state variable vector; and
  (e) means for periodically determining the state variable vector in synchronism with the sampling of the controlled parameter, wherein the state variable vector determined during a present period includes three components consisting of the accumulation value, the value of the controlled parameter sampled during the present period, and the value of the contol quantity determined during a period preceding the present period, respectively.

6. The control apparatus of claim 5 wherein the state variable vector determined during the present period further includes two other components consisting of the value of the controlled parameter sampled during the period preceding the present period, and the value of the control quantity determined during a period immediately prior to the period preceding the present period, respectively.

7. The control apparatus of claim 5 wherein the controlled parameter consists of an engine rotational speed.

* * * * *